United States Patent [19]

Morcom

[11] Patent Number: 4,835,616
[45] Date of Patent: May 30, 1989

[54] METHOD FOR OPERATING AN IMAGE SENSOR HAVING AN INTEGRATION PERIOD UNCOORDINATED WITH ITS FRAME PERIOD

[75] Inventor: Christopher J. Morcom, Maldon, United Kingdom

[73] Assignee: English Electric Valve Company Limited, Chelmsford, United Kingdom

[21] Appl. No.: 94,581

[22] Filed: Sep. 9, 1987

[30] Foreign Application Priority Data

Oct. 25, 1986 [GB] United Kingdom ............... 8625575

[51] Int. Cl.$^4$ ............................................. H04N 3/14
[52] U.S. Cl. ......................... 358/213.19; 358/213.13; 358/909
[58] Field of Search ...................... 358/213.13, 213.19, 358/909

[56] References Cited

U.S. PATENT DOCUMENTS

| | | | |
|---|---|---|---|
| 4,597,014 | 6/1986 | Suzuki | 358/213.13 |
| 4,608,605 | 8/1986 | Okino | 358/909 |
| 4,626,915 | 12/1986 | Takatsu | 358/213.13 |
| 4,647,976 | 3/1987 | Nakagaki et al. | 358/213.13 |
| 4,734,773 | 3/1988 | Ueda | 358/213.13 |

Primary Examiner—Jin F. Ng
Assistant Examiner—Stephen Brinich
Attorney, Agent, or Firm—Spencer & Frank

[57] ABSTRACT

A CCD image sensor is operated in an asynchronous mode to enable it to capture short lived events, or to freeze rapid motion. The image is acquired during an integration period which is triggered by a strobe pulse, and the resulting charge is held in a storage section of the CCD sensor until a regularly occuring field read-out period, during which the charge is read-out to constitute a video signal.

8 Claims, 3 Drawing Sheets

METHOD FOR OPERATING AN IMAGE SENSOR HAVING AN INTEGRATION PERIOD UNCOORDINATED WITH ITS FRAME PERIOD

BACKGROUND OF THE INVENTION

This invention relates to image sensors of the kind utilising charge coupled devices (CCD's), and an improved method of operation.

In CCD frame transfer image sensors, light representing an image is focussed onto a first photosensitive portion of an array of CCD channels comprising an image section of the array. A second portion of the array of CCD channels which is non photosensitive, (e.g, due to being shielded from light), comprises a store section Adjacent to the store section there is provided a read-out section A frame of charge photogenerated in the image section is transferred to the store section by applying clock pulses to the control electrodes of both sections, then read out in sequential line-by-line fashion by applying clock pulses to the control electrodes of both store and line read-out sections. Normally a frame of charge is read out of the store section as a further frame is being collected in the image section, and so on. Thus the 'integration period' during which a frame of photogenerated charge is collected in the image section of the sensor is usually about the same as the time taken to read out the previous frame of charge from the store section. The read out time is often fixed to conform to a given output standard, for example as in conventional 525/625 line television and is, in any case, limited by the physical constraints of the device structure, for example the speed of charge transfer.

This relatively long integration period can result in image smearing if the image sensor is used to image a fast moving object. With a conventional television camera or a CCD image sensor, a bright flash of illumination can be used to freeze the motion of the image after the manner of a stroboscope, but such an arrangement is inconvenient and cumbersome. It has been proposed to delay the onset of the integration period of the CCD sensor until immediately prior to the commencement of the read-out period, but of course this results in the short integration period occurring at a fixed predetermined instant in relation to the frame period. Whilst for some applications this may not be a drawback, it can cause a serious problem when a briefly occurring event is to be captured by the image sensor, as unless the event happens to occur during the very brief integration period, the event will be missed altogether and go unrecorded by the image sensor. The present invention seeks to reduce this difficulty.

SUMMARY OF THE INVENTION

According to this invention a method of operating a CCD image sensor which includes an image section comprising a photo-sensitive portion of an array of CCD channels, a store section comprising a non photo-sensitive portion of an array of CCD channels; a line read-out section adjacent to the store section; a control electrode structure associated with said image, store, and read out sections; a charge sink structure; the control electrode structure being adapted to receive potentials which transfer charge generated in the image section into the store section, and to read out charge stored in said store section via said read-out section to provide an output video signal; the method including the steps of generating charge at said photo-sensitive portion during an integration period which is short relative to the frame period of the sensor and which occurs at an unpredetermined time with respect thereto; transferring the charge generated during the integration period into said store section at the end of said integration period; holding said charge at said store section until the commencement of a regularly occurring frame period; and reading the charge from the store section via said read-out section for the duration of said frame period so as to thereby constitute an output video signal.

The CCD sensor may be of the kind in which the store section takes the form of a rectangular area between the image-section and the read-out section, or it may, for example, be of the "interline" kind in which the store section consists of strips interleaved between strips of the image section.

The duration of the integration period can therefore be very short, allowing a sharp image to be formed even of fast moving objects, or of events having a very short lifetime The integration period is not tied to the occurrence of the frame periods of any television system of which the CCD sensor forms a part, but instead the integration period is made to coincide with any event of interest which may occur at an arbitrary moment. The resulting pattern of charge which corresponds to the image of that event is then held in the storage section of the sensor until it can be slotted into the regularly occurring sequence of frame periods to be read out as the video signal It will be appreciated that a contribution to the video signal will not be available in each and every frame period, since the new charge pattern is read into the storage section during what, in a conventionally operated CCD sensor, would be a part of the read-out sequence for a preceding frame period

BRIEF DESCRIPTION OF THE DRAWINGS

The invention is further described by way of example with reference to the accompanying drawings, in which.

DETAILED DESCRIPTION OF THE PREFERRED EMBODIMENTS

Figure 1:
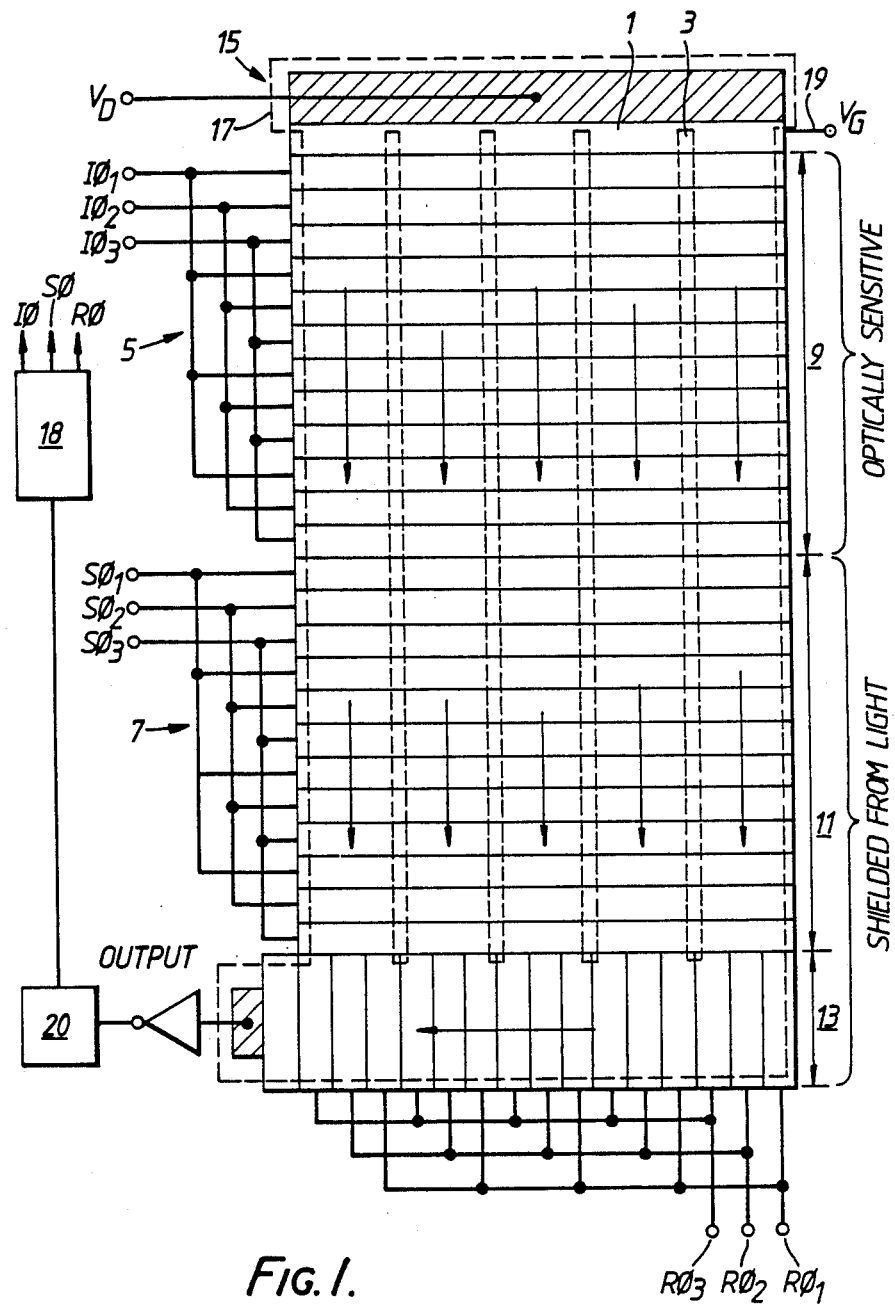
FIG. 1 shows a CCD image sensor.

Referring to FIG. 1, the sensor includes an array having a large number of charge transfer CCD channels 1 arranged side by side of which only five are illustrated. The array is fabricated in known manner on a silicon substrate, adjacent channels being isolated from each other by channel stop regions 3 in the substrate, represented by dotted lines in FIG. 1. Charge storage elements within each channel 1 are defined by a three-phase electrode structure 5,7, the storage elements within the channels being aligned to form a rectangular array of charge storage elements. One half of the array, the upper half in FIG. 1, is open to incoming light, and forms an image section 9 of the sensor, whilst the other half of the array, the lower half in FIG. 1, is shielded from the light, and forms a store section 11 of the sensor. At one end of the store section 11, the lower end in FIG. 1, there is a line read out section 13. Clock pulse generating means 18 are operative to apply clock pulses to the electrode structure of the image, store and read-out sections 9, 11, and 13 of the sensor.

Figure 2:
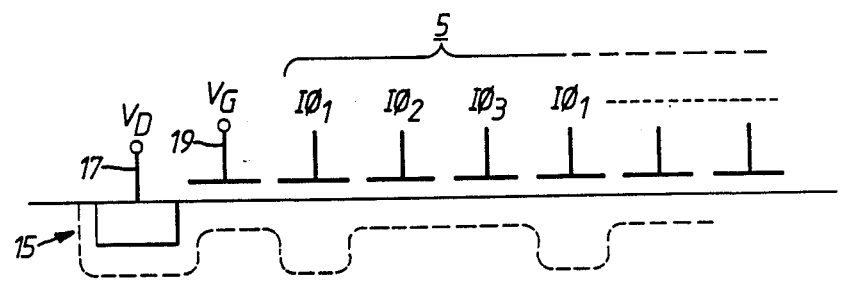
FIG. 2 shows a detail thereof.

Referring to FIG. 2, the sensor further includes a charge sink structure comprising an appropriately doped layer forming a p-n junction at the end of the image section of the array further from the store section, adjacent to the end storage elements of the channels 1. Interposed on the surface of the substrate between an electrode 17 provided to a p-n junction 15 and the first electrode of the electrode structure 5 is an additional electrode 19. In addition, the clock pulse generating means 18 is arranged so as to enable the electrode structure 5 of the image section a to be clocked in reverse sequence when required as well as in the normal forward sequence.

In use an optical image is focussed onto the image section 9 of the sensor, and a charge pattern corresponding to the image is generated by the photoelectric effect in the storage elements underlying the image. A frame of charge thus generated over a period of time, the integration period, in the charge storage elements of the image section 9, is, by application of clock pulses $I\phi_1$, $I\phi_2$, $I\phi_3$, to the electrode structure 5 and clock pulses $S\phi_1$, $S\phi_2$, and $S\phi_3$, to the electrode structure 7, transferred quickly to the store section 11. At a later time it is then read out sequentially line by line, through the line read-out section 13 by application of further clock pulses $S\phi_1$, $S\phi_2$, $S\phi_3$, to the store section electrode structure 7, and $R\phi_1$, $R\phi_2$, $R\phi_3$, to the read-out section electrode structure.

When the electrode structure is reverse clocked, if the p-n junction 15 is held under sufficient reverse bias ($V_D$), charge photo-generated in the image section 9 will be transferred up the image section to be dumped in the sink formed by the junction 15. When the reverse clocking stops, the effective integration period will then be the remainder of the period before frame transfer to the store 11 takes place. Thus control of the effective integration time is achieved by choosing the time at which the reverse clocking stops, and the time at which frame transfer takes place. The electrode 19 is held at a fixed bias $V_G$ to isolate the sink from the CCD when charge dumping is not required.

The charge sink region may be a localised region at the end of the image section which is remote from the read-out section, or the charge sink region may comprise anti-blooming channels having a variable gate threshold. As is known, anti-blooming channels are separated from image channels by a potential barrier, over which excess charge (which results from intense optical illumination) is able to pass. By lowering the potential barrier during what is termed the reverse clocking period, all photo-generated charge leaks away into the anti-blooming channels, leaving the image section free of charge at the beginning of the integration period.

Figure 3:
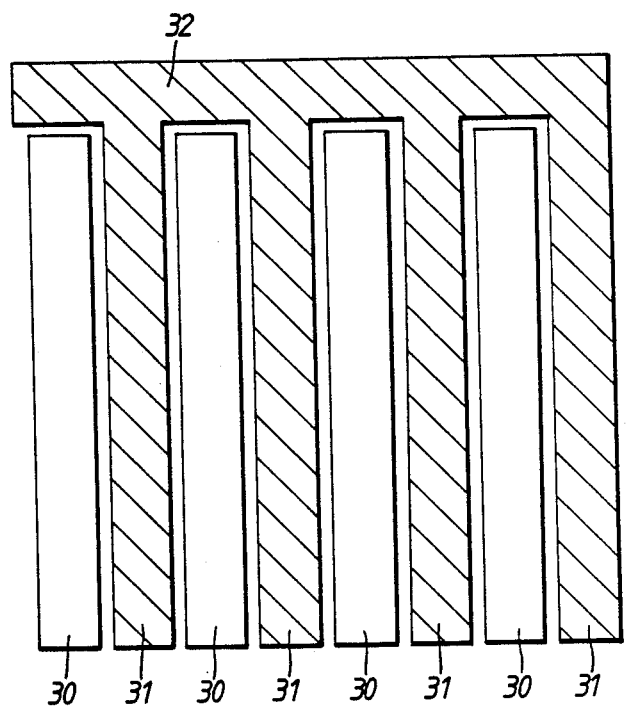
FIG. 3 shows an alternative form of CCD image sensor.

In FIG. 3, an alternative form of CCD sensor is shown, of the kind termed "interline". The image section consists of strips 30 which are unshielded, and these strips are interleaved with storage strips 31 which are shielded from light and which constitute the storage section. The read-out section 32 is connected across the ends of the storage strips 31. The operation is analogous to that of the structure shown in FIGS. 1 and 2. In FIG. 3, charge accumulates in the strips 30 during an integration period, and is transferred sideways into the adjacent storage strips 31 at the end of the integration period. During the read-out period the charges are clocked along the storage strips 31 by one line increment at each clock cycle into the read-out section 32, from whence the charge is clocked out one complete line at a time to form the output video signal Charge clearance prior to the integration period can be achieved by, for example, the use of gated anti-blooming channels.

Figure 4:
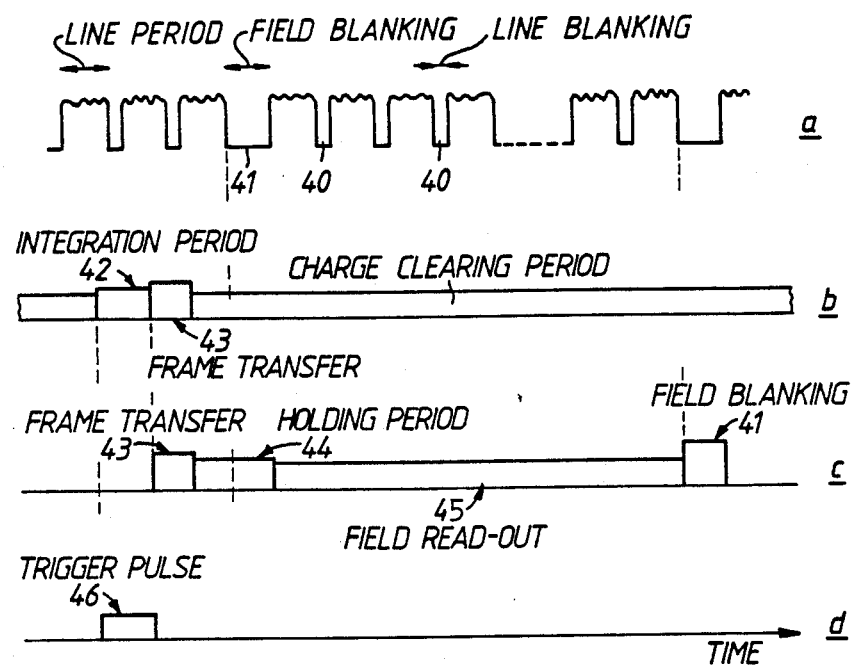
FIGS. 4 and 5 illustrate waveforms relating to the mode of operation.

A conventional output video signal of the form shown in FIG. 4(a) includes periods of zero output known as line blanking periods 40, between the signals for successive lines during each of which a line of charge is transferred from the store section to the read-out section to constitute the active video signal, and periods of zero output, known as field blanking periods 41, between the signals for successive fields, during which there occurs a period in which a frame of charge is transferred from the image section to the store section, i.e. a frame transfer period. Following a typical field transfer period shown, the CCD sensor is reverse clocked to clear the image sensing area of any charges which accumulate. In acordance with this invention, reverse clocking continues during each line blanking period until it is desired to capture a particular short lived event, when the reverse clocking is terminated to allow an integration period 42 to begin, during which charges representative of the imaged scene are generated. FIG. 4(b) relates to the operation of the image section. This integration period 42 is typically very short, of the order of 1 mS, and after the end of this period, forward Clocking is commenced to transfer the charges to the storage section - thus this period 43 is called a frame transfer period. The charges are allowed to remain in the storage section, with read-out being inhibited, during a holding period 44 until the next field read-out period 45, when read-out of a video signal at a conventional rate begins, and lasts for the duration of the field read-out period 45. The duration of the holding period 44 is not predetermined, but depends on the instant at which a trigger pulse 46 occurs in relation to a field blanking pulse. This trigger pulse acts as a strobe and determines the instant at which an image of the viewed scene is captured by the CCD sensor. Following the frame transfer of the charges from the image section to the storage section, reverse clocking of the image section is recommenced. The steps representing the operation of the store section are shown in FIG. 4c, the blanking periods being shown in broken line to indicate their nominal position. The instant at which the integration period 42 begins is determined by the leading edge of the trigger pulse shown in FIG. 4d, and in practice will generally be triggered by an external event. The duration of the trigger pulse itself is usually predetermined, and is chosen with regard to the speed of movement of objects in the field of view of the sensor, or the expected lifetime of a short lived event. Following completion of the field read-out period 45, the standard television field blanking signals are inserted into the video output signal, and in order to present a continuous picture to a person viewing a television monitor on which the video signal is reproduced, the field read-out signal can be stored and repeatedly read-out until a new video field is generated. In practice, however, the output video signal will be presented to a machine-vision system as part of an automated process.

Figure 5:
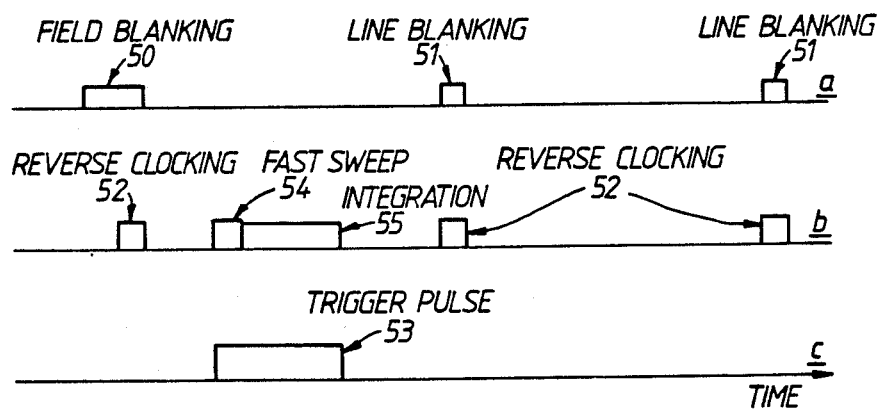

FIG. 5 shows a different aspect of the invention, in which a burst of reverse clocking is provided immediately prior to the integration period to ensure that the image section is completely cleared of unwanted charges. As before, field blanking periods 50 occur regularly, with the usual number of line blanking periods interposed between them (FIG. 5a), and short bursts of reverse clocking coincide with the line blanking periods (FIG. 5b). When a trigger pulse 53 arises (FIG. 5c), a fast sweep 54 of reverse clocking first occurs to clear any residual signals (as described in UK Pat. No. 2140651A), after which an integration period 55 commences. Following the integration period 55, frame transfer of the optically generated charges to the storage section takes place where it is retained during the holding period 44. The sequence then repeats, as in FIG. 4. With the variant shown in FIG. 5, part of the trigger period is used to clear the image section of previously generated unwanted charge, so the integration period is a little shorter than it should be, but the shortening is slight, and overall is beneficial in view of the improved image contrast, as the whole of the image section is swept clear of unwanted charge immediately prior to the integration period.

I CLAIM:

1. A method of operating a CCD image sensor which includes an image section comprising a photo-sensitive portion of an array of CCD channels, a store section comprising a non photo-sensitive portion of an array of CCD channels, a line read-out section adjacent to the store section., a control electrode structure associated with said image, store, and read out sections; a charge sink structure; the control electrode structure being adapted to receive potentials which transfer charge generated in the image section into the store section, and to read out charge stored in said store section via said read-out section to provide an output video signal: the method including the steps of generating charge at said photo-sensitive portion during an integration period which is short relative to the frame period of the sensor and which occurs at an un-predetermined time with respect thereto; transferring the charge generated during the integration period into said store section at the end of said integration period; holding said charge at said store section until the commencement of a regularly occurring frame period; and reading the charge from the store section via said read-out section for the duration of said frame period so as to thereby constitute an output video signal.

2. A method as claimed in claim 1 and wherein the occurence of the integration period is determined by an externally applied strobe signal 3. A method as claimed in claim 2, and wherein the duration of the strobe signal determines the duration of the integration period 4. A method as claimed in claim 1, and wherein regular charge clearance of the image section occurs prior to the application of the strobe signal 5. A method as claimed in claim 1, and wherein charge clearance of the image section is initiated by the application of the strobe signal, this charge clearance period being shorter than the following integration period.

6. A method as claimed in claim 2, and wherein regular charge clearance of the image section occurs prior to the application of the strobe signal.

7. A method as claimed in claim 2, and wherein charge clearance of the image section is initiated by the application of the strobe signal, this charge clearance period being shorter than the following integration period.

8. In a method of operating a CCD image sensor having a frame period and which includes an image section comprising a photo-sensitive portion of an array of CCD channels; a store section comprising a non-photo-sensitive portion of an array of CCD channels; a line read-out section adjacent to the store section; an electrode structure for controlling operation of the image section, the store section, and the line read-out section; and a charge sink structure, the electrode structure being responsive to an applied voltage to cause charge generated in the image section to be transferred to the store section and to read out charge stored in the store section via the read-out section to produce an output video signal, the steps comprising:

clearing charge from the image section until a trigger pulse is received by the electrode structure, the trigger pulse being relatively short compared to the frame period and uncoordinated with the frame period;

generating charge at the image section in response to incident radiation while the trigger pulse is maintained;

transferring generated charge from the image section to the store section when the trigger pulse ends;

holding the generated charge at the store section until the commencement of another frame period; and reading out the generated charge from the store section via the read-out section as an output video signal.

* * * * *